US009527205B1

(12) United States Patent
Lin

(10) Patent No.: US 9,527,205 B1
(45) Date of Patent: Dec. 27, 2016

(54) CART FOR STORAGE OF TOOLS AND PARTS

(71) Applicant: Yun-Huei Lin, Taichung (TW)

(72) Inventor: Yun-Huei Lin, Taichung (TW)

( * ) Notice: Subject to any disclaimer, the term of this patent is extended or adjusted under 35 U.S.C. 154(b) by 0 days.

(21) Appl. No.: 15/144,796

(22) Filed: May 2, 2016

(51) Int. Cl.
*B62B 3/02* (2006.01)
*B25H 1/12* (2006.01)
*B62B 3/00* (2006.01)
*B25H 3/02* (2006.01)

(52) U.S. Cl.
CPC ............. *B25H 1/12* (2013.01); *B25H 3/023* (2013.01); *B62B 3/005* (2013.01); *B62B 2205/32* (2013.01)

(58) Field of Classification Search
CPC ........ B62B 3/002; B62B 3/005; B62B 3/1468; B25H 1/12
USPC ................................................ 280/47.35, 79.3
See application file for complete search history.

(56) References Cited

U.S. PATENT DOCUMENTS

| | | | | |
|---|---|---|---|---|
| 4,120,549 A * | 10/1978 | Bureau | ............. | B25H 3/00 280/47.35 |
| 4,743,040 A * | 5/1988 | Breveglieri | ............. | B62B 3/10 280/47.35 |
| 4,779,940 A * | 10/1988 | Ralston | ............. | A47B 85/00 190/12 R |
| 4,875,696 A * | 10/1989 | Welch | ............. | B62B 5/04 188/1.12 |
| 4,923,202 A * | 5/1990 | Breveglieri | ............. | B62B 3/10 108/107 |
| 4,976,450 A * | 12/1990 | Ellefson | ............. | A47F 5/05 108/103 |
| 5,069,464 A * | 12/1991 | Braconnier | ............. | B62B 3/10 280/47.35 |
| 5,588,659 A * | 12/1996 | Boes | ............. | B25H 3/04 206/378 |
| 5,634,649 A * | 6/1997 | Breining | ............. | B25H 1/04 280/47.35 |
| 5,738,423 A * | 4/1998 | Alfaro | ............. | A63H 33/3072 312/244 |
| 6,047,750 A * | 4/2000 | Jensen | ............. | B25H 1/04 108/26 |
| 6,053,587 A * | 4/2000 | Boerder | ............. | A47B 83/045 280/30 |
| 6,079,719 A * | 6/2000 | Tisbo | ............. | A47B 88/044 280/47.19 |
| 6,086,073 A * | 7/2000 | Tisbo | ............. | B25H 1/02 280/47.26 |
| 6,176,559 B1 * | 1/2001 | Tiramani | ............. | B25H 3/023 280/47.19 |

(Continued)

*Primary Examiner* — Jeffrey J Restifo

(57) ABSTRACT

A cart includes a frame having four detachable first posts and each first post has multiple grooves defined radially in the outer periphery thereof. Multiple fixing members each are a plate having a semi-circular cross section. A protrusion extends from the inner periphery of each of the fixing members so as to be engaged with the groove. Multiple pairs of the fixing members are connected to each one of the first posts. Each tray has a cone-shaped first fixing member on each of four corners thereof so as to be respectively connected to the four first posts. Each of the first posts has one wheel connected to the lower end thereof. A box is connected between the trays and includes an outer body and at least one inner body which is removably inserted into the outer body. Tools and parts are received in the inner body.

11 Claims, 24 Drawing Sheets

(56) References Cited

U.S. PATENT DOCUMENTS

| | | | | |
|---|---|---|---|---|
| 6,347,847 B1* | 2/2002 | Tiramani | B25H 3/00 190/18 A | |
| 7,044,569 B1* | 5/2006 | Relyea | A47B 67/04 280/47.35 | |
| 7,213,817 B2* | 5/2007 | Cheung | B62B 3/025 280/42 | |
| 8,157,337 B2* | 4/2012 | Manalang | B25H 3/06 211/70.6 | |
| 8,191,910 B2* | 6/2012 | Landau | B25H 3/021 211/85.17 | |
| 2004/0066012 A1* | 4/2004 | Choi | B62B 3/02 280/47.35 | |
| 2005/0001395 A1* | 1/2005 | Fuentes | A61G 12/001 280/47.35 | |
| 2005/0140106 A1* | 6/2005 | Huguet | A47B 95/043 280/79.3 | |
| 2006/0237933 A1* | 10/2006 | Suchecki | B62B 3/002 280/79.2 | |
| 2009/0295110 A1* | 12/2009 | Wilsher | A47B 67/005 280/47.35 | |
| 2010/0052276 A1* | 3/2010 | Brunner | B25H 3/027 280/47.35 | |
| 2010/0072716 A1* | 3/2010 | Grela | B25H 3/021 280/47.35 | |
| 2012/0061930 A1* | 3/2012 | Lin | B25H 3/02 280/47.35 | |
| 2012/0085714 A1* | 4/2012 | Johnson | A47B 55/02 211/41.1 | |
| 2013/0026120 A1* | 1/2013 | Johnson | A47B 55/02 211/85.5 | |
| 2013/0087982 A1* | 4/2013 | Grela | B25H 3/028 280/79.2 | |
| 2013/0099458 A1* | 4/2013 | Ryan | A45D 29/18 280/47.131 | |
| 2014/0217690 A1* | 8/2014 | Schumaker | B62B 3/005 280/47.35 | |
| 2014/0217861 A1* | 8/2014 | Cole | A47B 45/00 312/205 | |
| 2014/0265440 A1* | 9/2014 | Chen | B62B 5/0006 296/186.1 | |
| 2015/0115786 A1* | 4/2015 | Manalang | B25H 3/028 312/321.5 | |
| 2015/0328768 A1* | 11/2015 | Martin | A47B 81/00 312/237 | |
| 2016/0067863 A1* | 3/2016 | Cole | B25H 3/028 269/16 | |

* cited by examiner

CART FOR STORAGE OF TOOLS AND PARTS

BACKGROUND OF THE INVENTION

1. Fields of the Invention

The present invention relates to a cart, and more particularly, to a cart for storage of tools and parts.

2. Descriptions of Related Art

The conventional cart for receiving tools known to applicant is disclosed in U.S. Pat. No. 8,333,160, and comprises a main frame including a plurality of poles standing in parallel and a plurality of wire plates. Each wire plate has a plurality of rings designated around to be locked upon corresponding poles at a fixed position. Each ring is fixed on the pole by a position assembly. The position assembly comprises a pair of arched position pieces. There are a plurality of annular grooves laterally allocated along the periphery of each pole, and each arched position piece has an outer periphery opposite to an inner periphery. The outer periphery of the position piece has a laterally slanted tapered arc surface. The inner periphery of the position piece has an annular flange, and the annular flange is lodged in the annular groove. The ring is applied to hoop the pair of position pieces while the position pieces are applied to clasp onto the outer periphery of the pole, and the ring is fixed on the pole inasmuch as the tapered arc surfaces is firmly against the inner wall of the ring. At least a toolbox includes two box members which are able to be placed on the wire plate with trays defined thereon for placing tools or parts, and at least a handle has two sleeves. An inner wall of each sleeve is same shape with the ring so as to clasp onto the poles. However, the tools or parts are exposed and make the tool cart be messy. The connection between the trays and toolboxes are complicated and not secured.

The present invention intends to provide a cart for storage of tools and parts and which eliminates the shortcomings mentioned above.

SUMMARY OF THE INVENTION

The present invention relates to a cart for storage of tools and parts, and the cart comprises a frame having four detachable first posts, twenty four fixing members, multiple trays, four wheels and four covers. The first posts each have multiple grooves defined radially in the outer periphery thereof. A threaded hole is defined in the top of each first post.

Each fixing member is a plate having a semi-circular cross section, and a protrusion extends from the inner periphery of each of the fixing members so as to be engaged with the groove. Each fixing member has a tapered outer face. Three pairs of the fixing members are connected to each one of the first posts.

Each tray has a cone-shaped first fixing member on each of four corners thereof, and the four first fixing members are respectively connected to the four first posts. Each tray has at least one first room defined therein. Multiple trays are connected to the four first posts and located between the four first posts.

Each of the first posts has one wheel connected to the lower end thereof so that the frame is movable. The four covers are respectively connected to the threaded holes of the four first posts.

Two boxes are connected between the trays and each box is a tool box. Each box has an outer body and at least one inner body. The outer body has an open top and an open side. The outer body has a second room. Two second fixing portions respectively extend from two sides of the outer body. The second fixing portions are respectively connected to two sides of the underside of the tray located above the box. The at least one inner body is movably inserted into the second room of the outer body and located between the tray and the outer body. The at least one inner body has an open top. One of the two boxes has one inner body received therein, and the other one of the two boxes has three inner bodies receiving therein. Tools and parts are received in the respective inner bodies.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figures 1, 2:
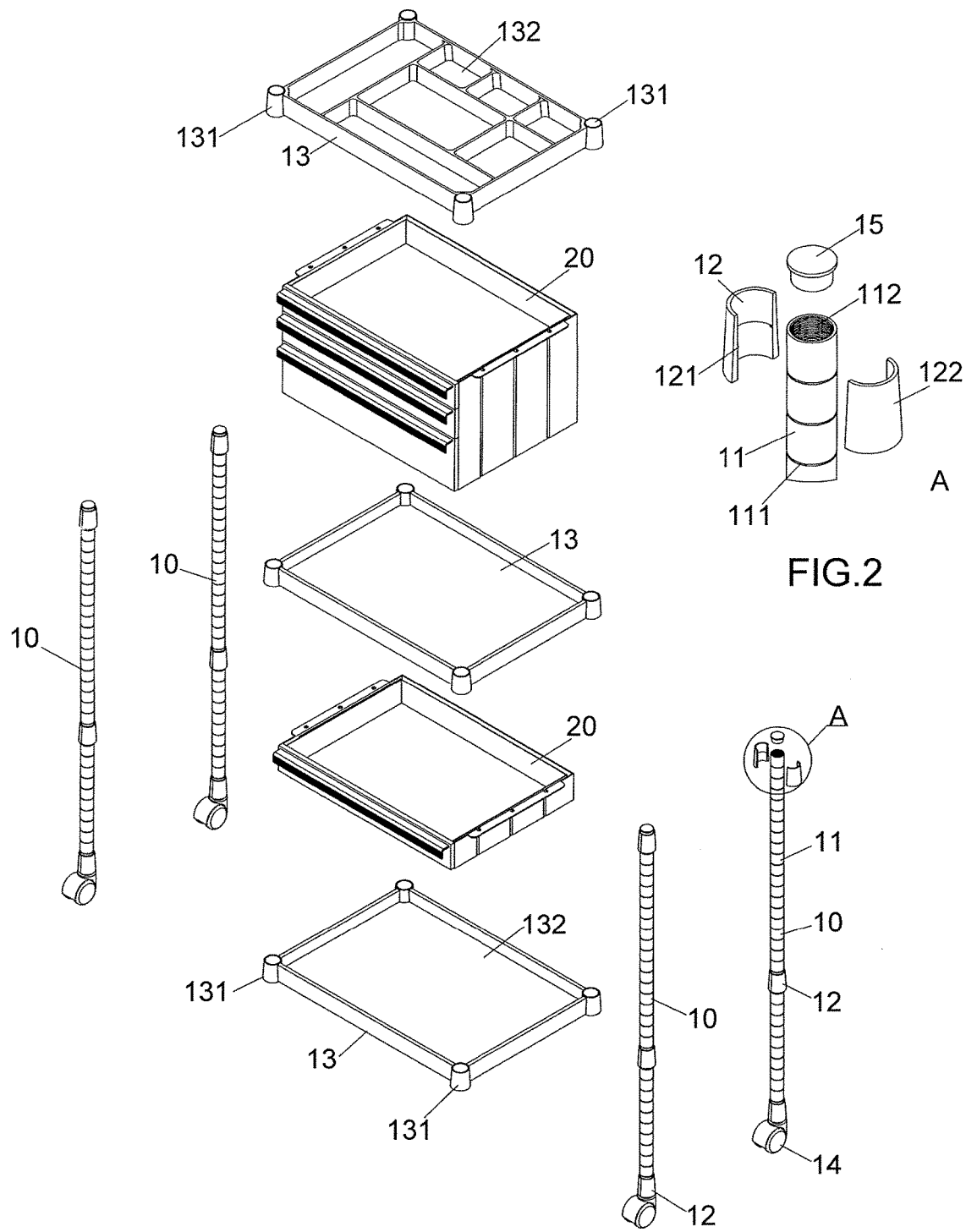
FIG. 1 is an exploded view of the cart of the present invention.
FIG. 2 is an enlarged view of the circled "A" in FIG. 1.
Figure 3:
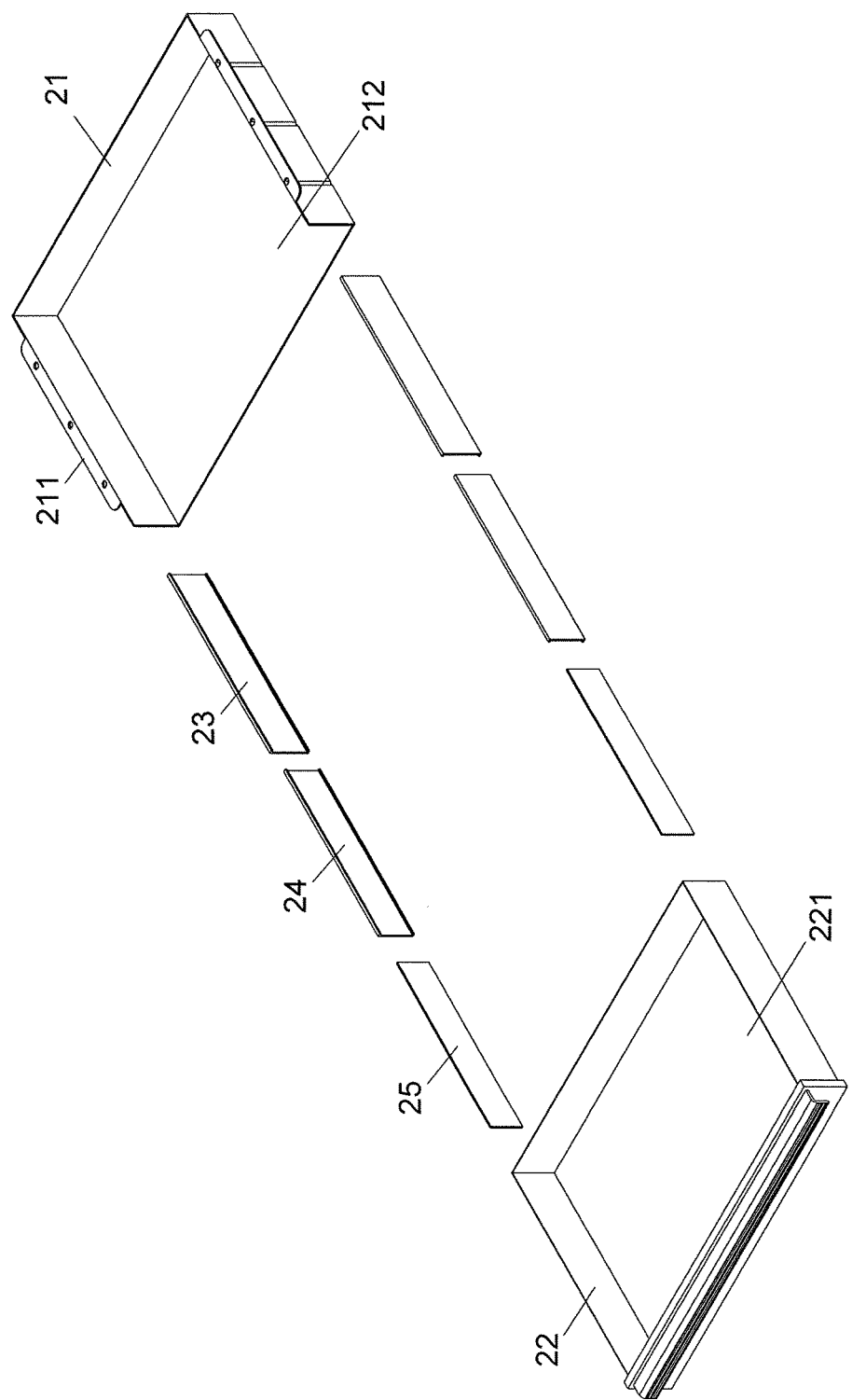
FIG. 3 is an exploded view of the box of the cart of the present invention.
Figure 5:
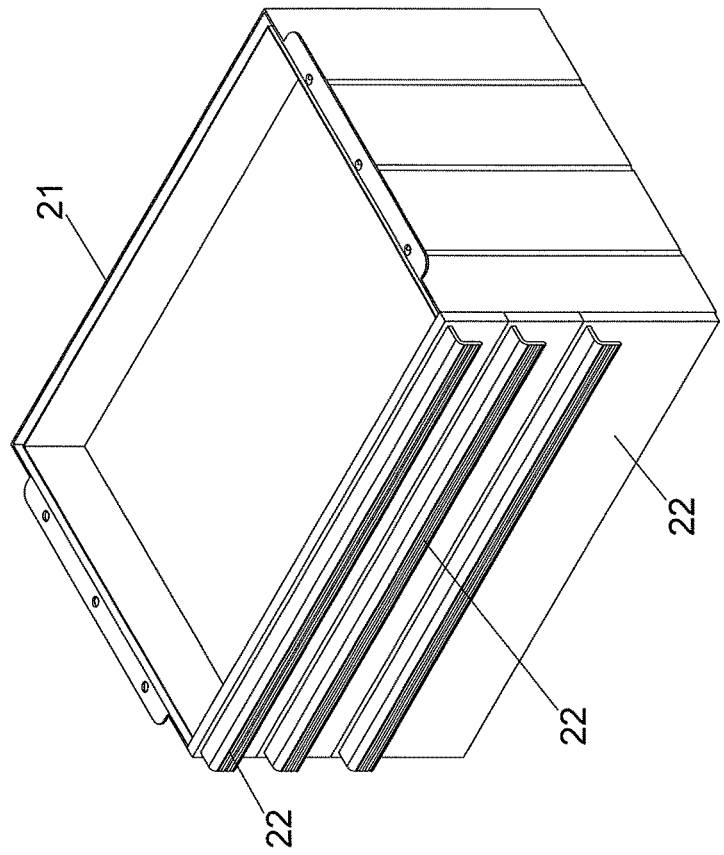
FIG. 5 is a perspective view to show another box of the cart of the present invention.
Figure 4:
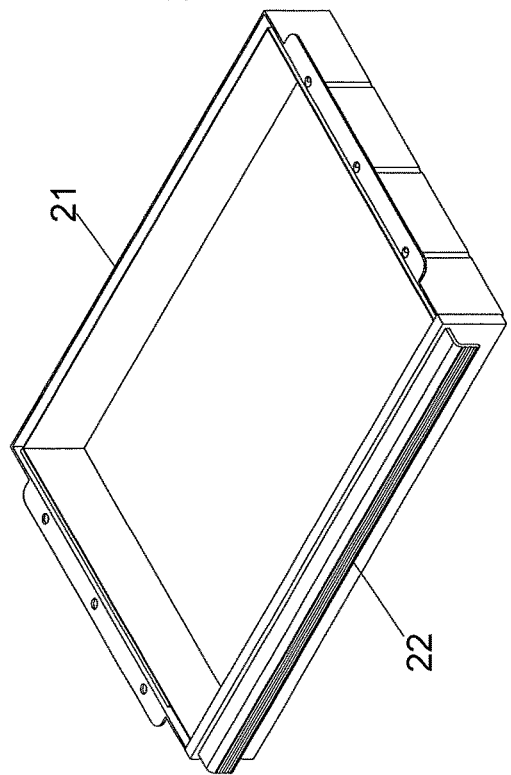
FIG. 4 is a perspective view to show the box of the cart of the present invention.
Figure 6:
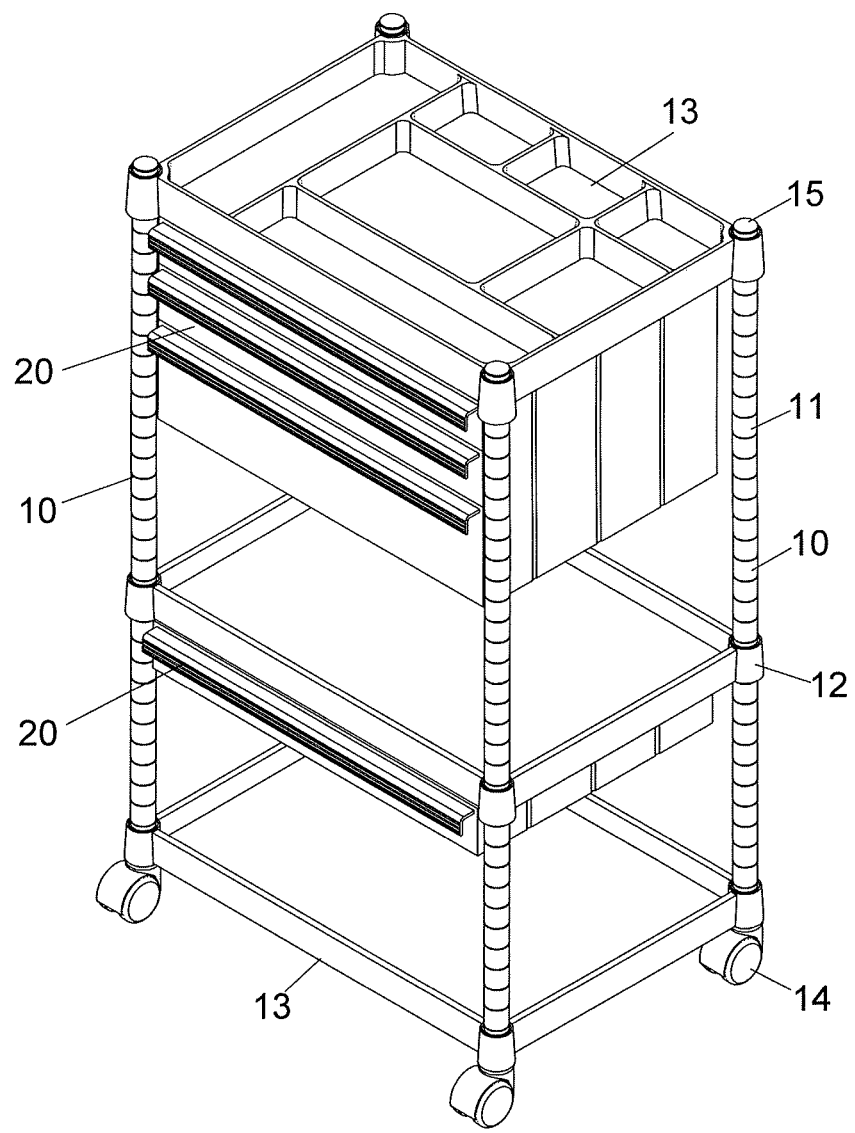
FIG. 6 is a perspective view to show the cart of the present invention.

Referring to FIGS. 1 to 6, the cart for storage of tools and parts of the present invention comprises a frame 10 having four detachable first posts 11, twenty four fixing members 12, three trays 13, four wheels 14 and four covers 15.

The first posts 11 each have multiple grooves 111 defined radially in the outer periphery thereof, and a threaded hole 112 is defined in the top of each first post 11. Each fixing member 12 is a plate having a semi-circular cross section. A protrusion 121 extends from the inner periphery of each of the fixing members 12 so as to be engaged with the groove 111. Each fixing member 12 has a tapered outer face 122. Three pairs of the fixing members 12 are connected to each one of the first posts 11. Each pair of the fixing members 12 form a tapered and cylindrical portion.

Each tray 13 has a cone-shaped first fixing member 131 on each of four corners thereof. The four first fixing members 131 are respectively mounted to the tapered and cylindrical portions formed by the pairs of the fixing members 12 on the four first posts 11. Each tray 13 has at least one first room 132 defined therein so as to receive parts or tools. The three trays 13 are connected to the four first posts 11 and located between the four first posts 11. Each tray 13 has a closed bottom. Each of the first posts 11 has one wheel 14 connected to the lower end thereof so that the frame 10 is movable. The four covers 15 are respectively connected to the threaded holes 112 of the four first posts 11 so as to seal the top of each of the first posts 11.

Two boxes 20 are connected between the trays 13 and each box 20 is a tool box. Each box 20 has an outer body 21 and at least one inner body 22. The outer body 21 has an open top and an open side. The outer body 21 has a second room 212. Two second fixing portions 211 respectively extend from two sides of the outer body 21, and the second fixing portions 211 are respectively connected to two sides of the underside of the tray 13 located above the box 20. The at least one inner body 22 is movably inserted into the second room 212 of the outer body 21 and located between the tray 13 and the outer body 21. The at least one inner body 22 has an open top, and a space 221 is defined in the at least one inner body 22 to receive tools and parts. The at least one inner body 22 is movably accommodated in the second room 212 of the outer body 21. Each of the two boxes 20 has a first rail 23, a second rail 24 and a third rail 25 on each of two sides thereof. The second rail 24 is movably connected the inside of the first rail 23 corresponding thereto, and the third rail 25 is movably connected the inside of the second rail 24 corresponding thereto. The first rails 23 are fixed to the outer body 21. The third rail 25 are fixed to the inner body 22. The first, second and third rails 23, 24, 25 restrict the maximum distance that the inner body 22 is moved relative to the outer rail 21. In this embodiment, one of the two boxes 20 has one inner body 22 received therein, and the other one of the two boxes 20 has three inner bodies 222 receiving therein.

Figure 7:
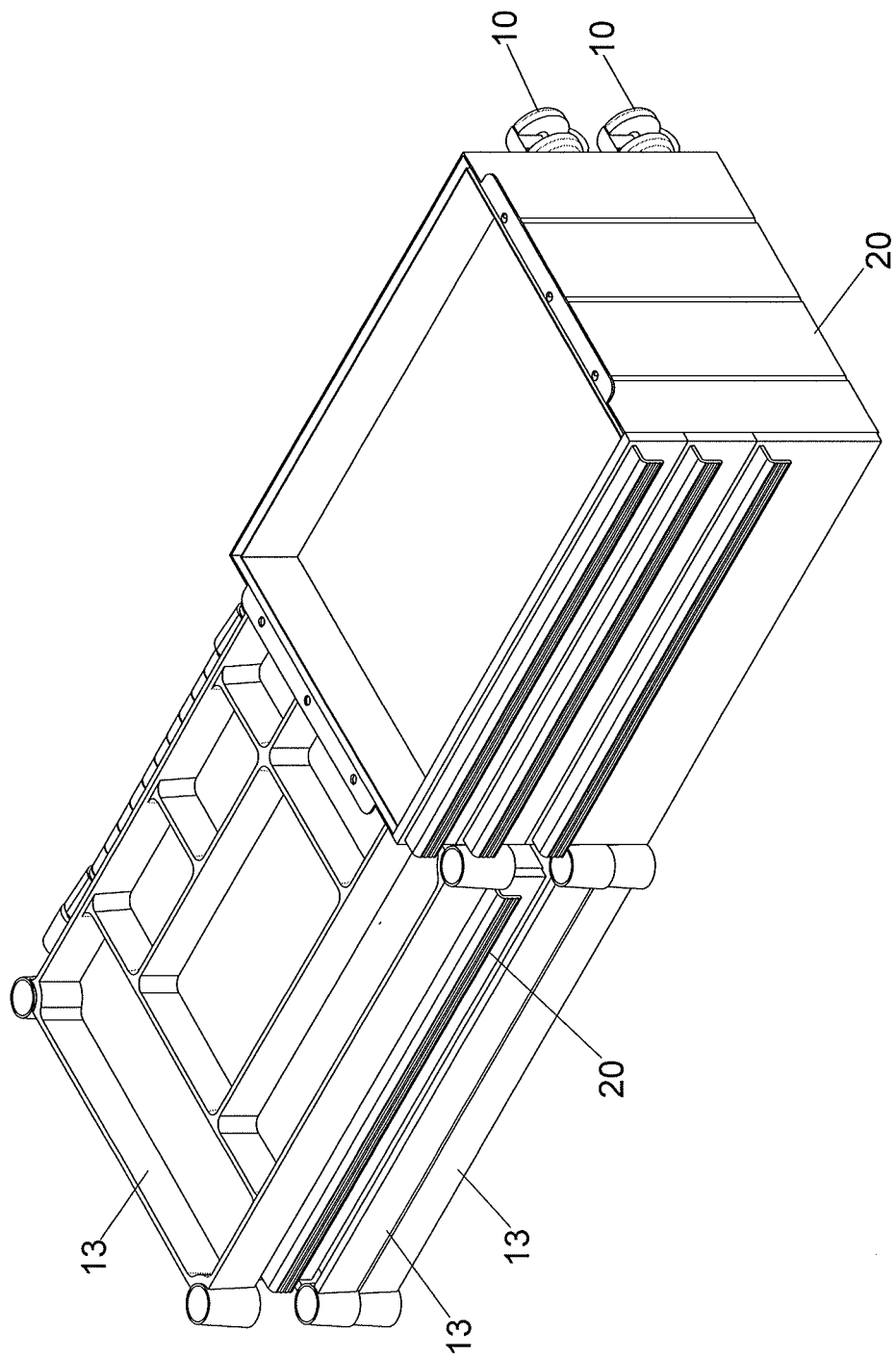
FIG. 7 is a perspective view to show the combination of the boxes and the trays of the cart of the present invention.
Figures 8, 9:
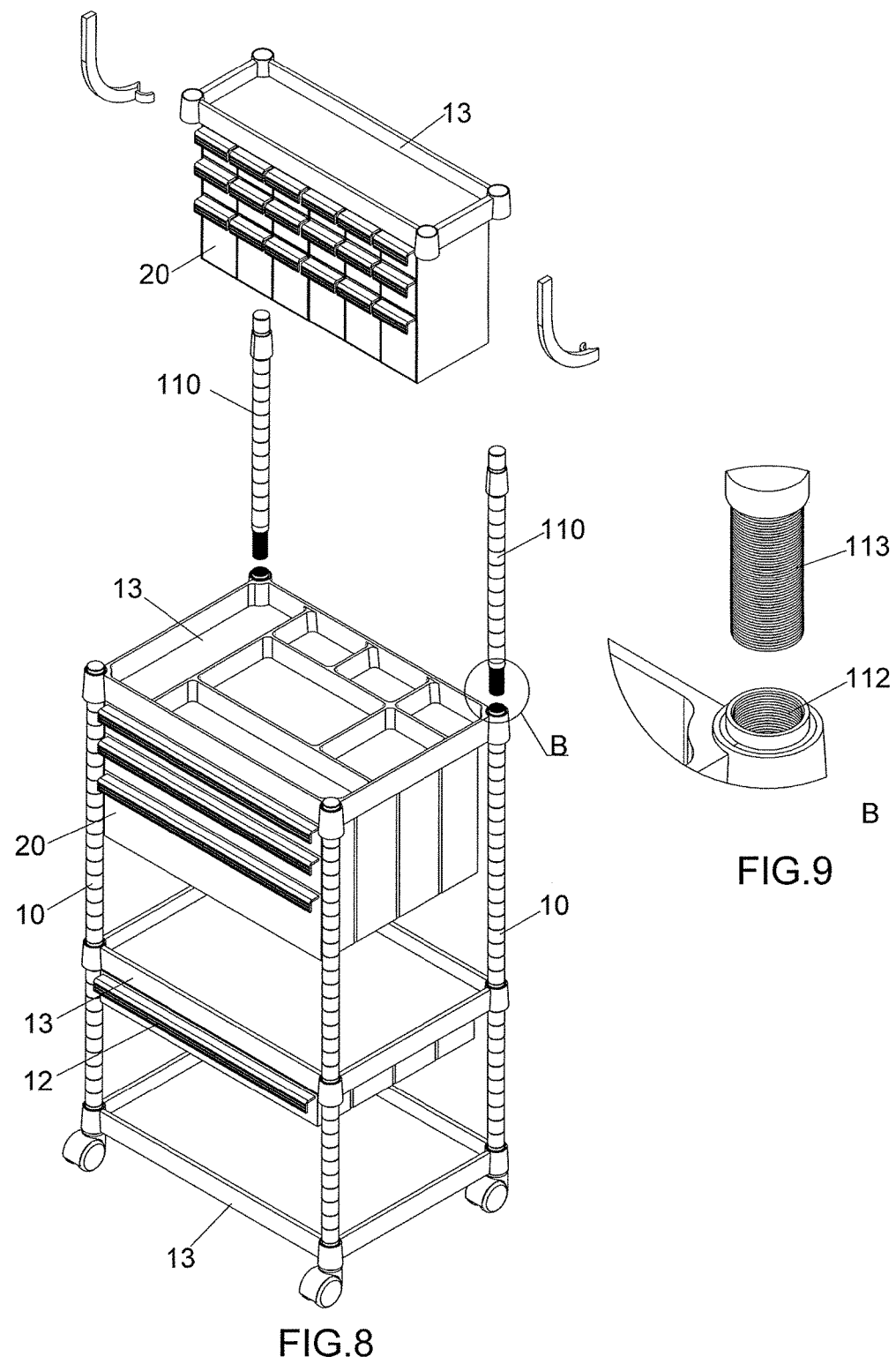
FIG. 8 is an exploded view of the second embodiment of the cart of the present invention.
FIG. 9 is an enlarged view of the circled "B" in FIG. 8.

As shown in FIG. 7, when not in use, the cart of the present invention can be detachable into several compact combinations which do not occupy too much space and are easy for transportation.

Figure 10:
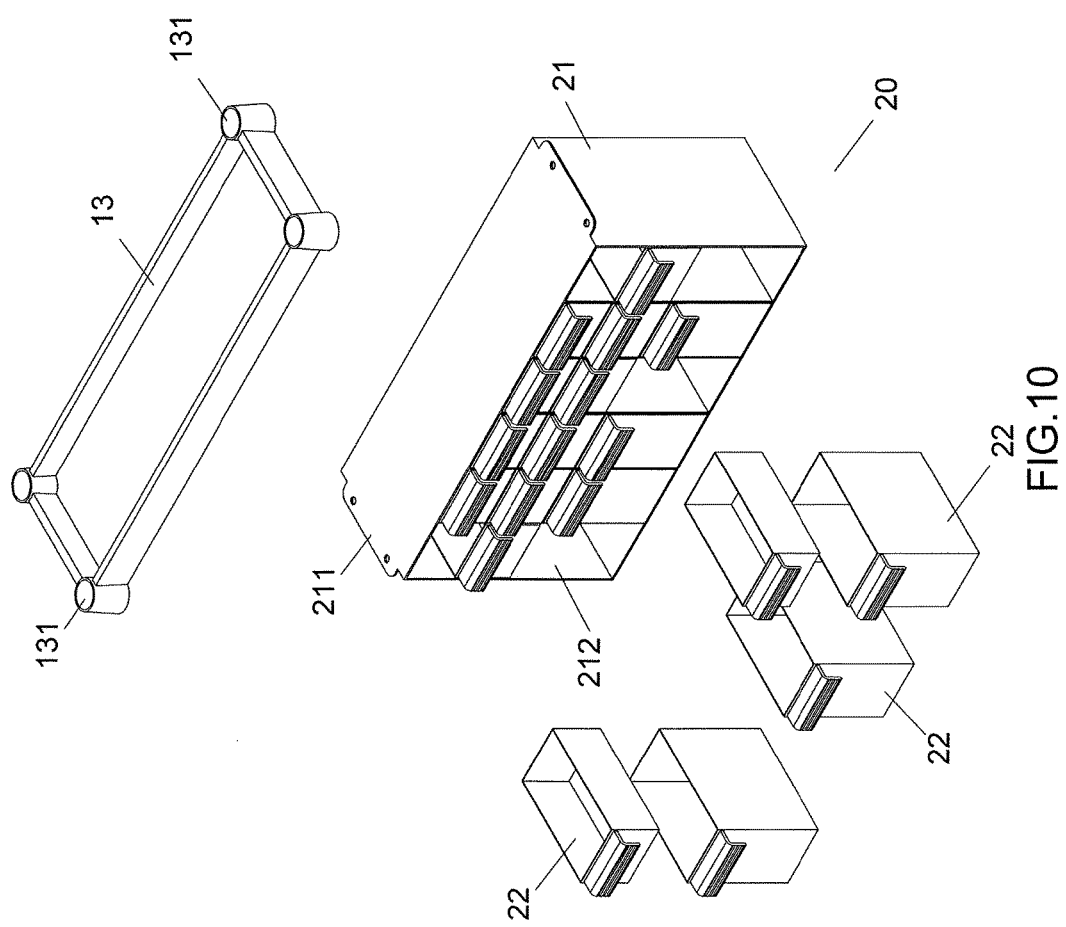
FIG. 10 shows the tool box including the outer body and inner bodies, and the tray of the second embodiment of the cart of the present invention.
Figure 11:
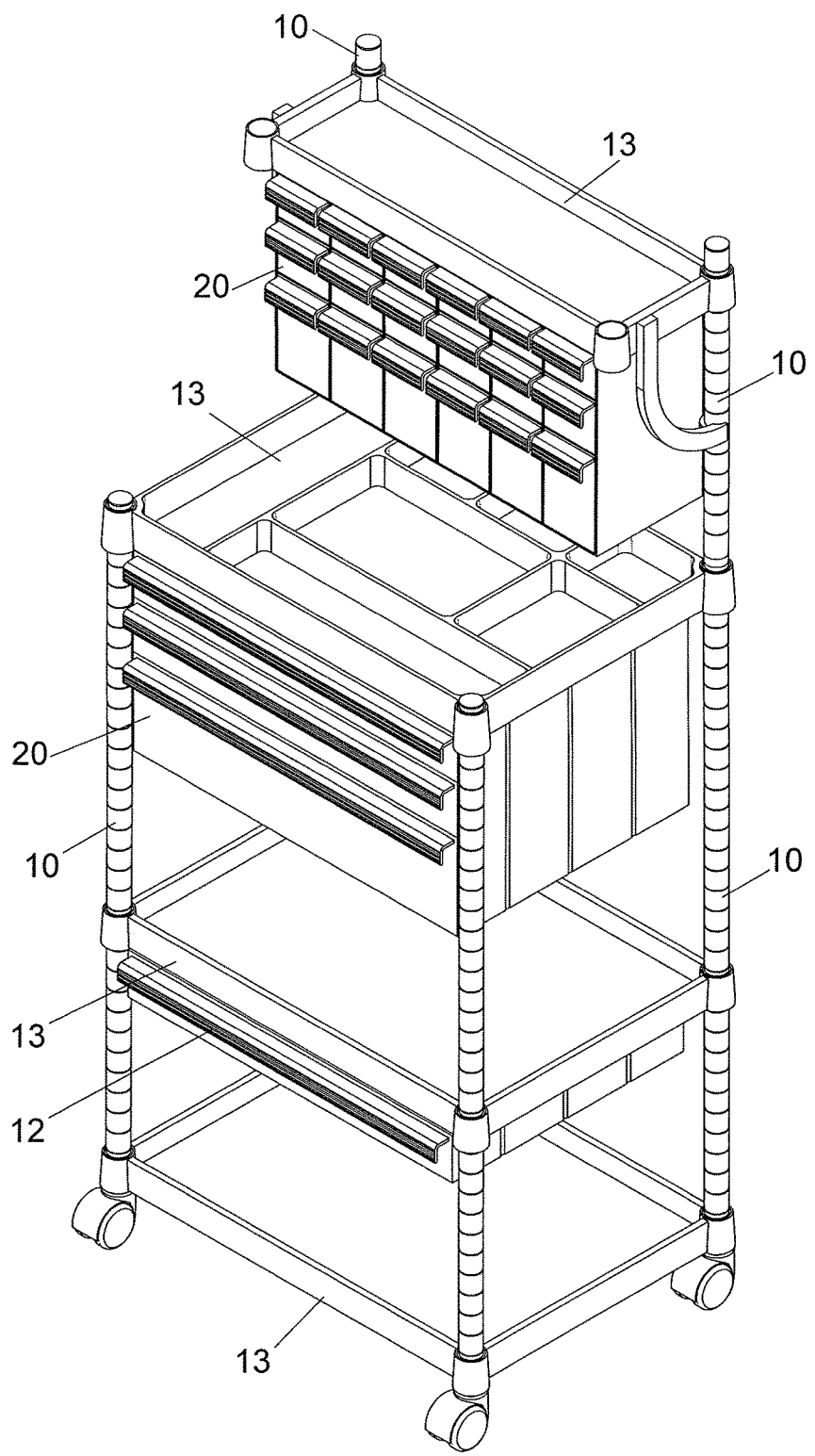
FIG. 11 is a perspective view to show the second embodiment of the cart of the present invention.

As shown in FIGS. 8 to 11, two second posts 110 are respectively connected to the four first posts 11. Each second post 110 is shorter than that of the first posts 11. Each second post 110 has a threaded section 113 which are threadedly connected to the threaded hole 112 of the first post 11 corresponding thereto. Another tray 13 and another box 20 are connected between the two second posts 110. As shown in FIG. 10, The outer body 21 of the box 20 between the two second posts 110 has multiple second rooms 212 defined therein, and each second room 212 has one inner body 22 movably received therein. Each inner body 22 is a rectangular box with an open top so as to be used as a drawer or a tool box for receiving tools and parts.

Figure 13:
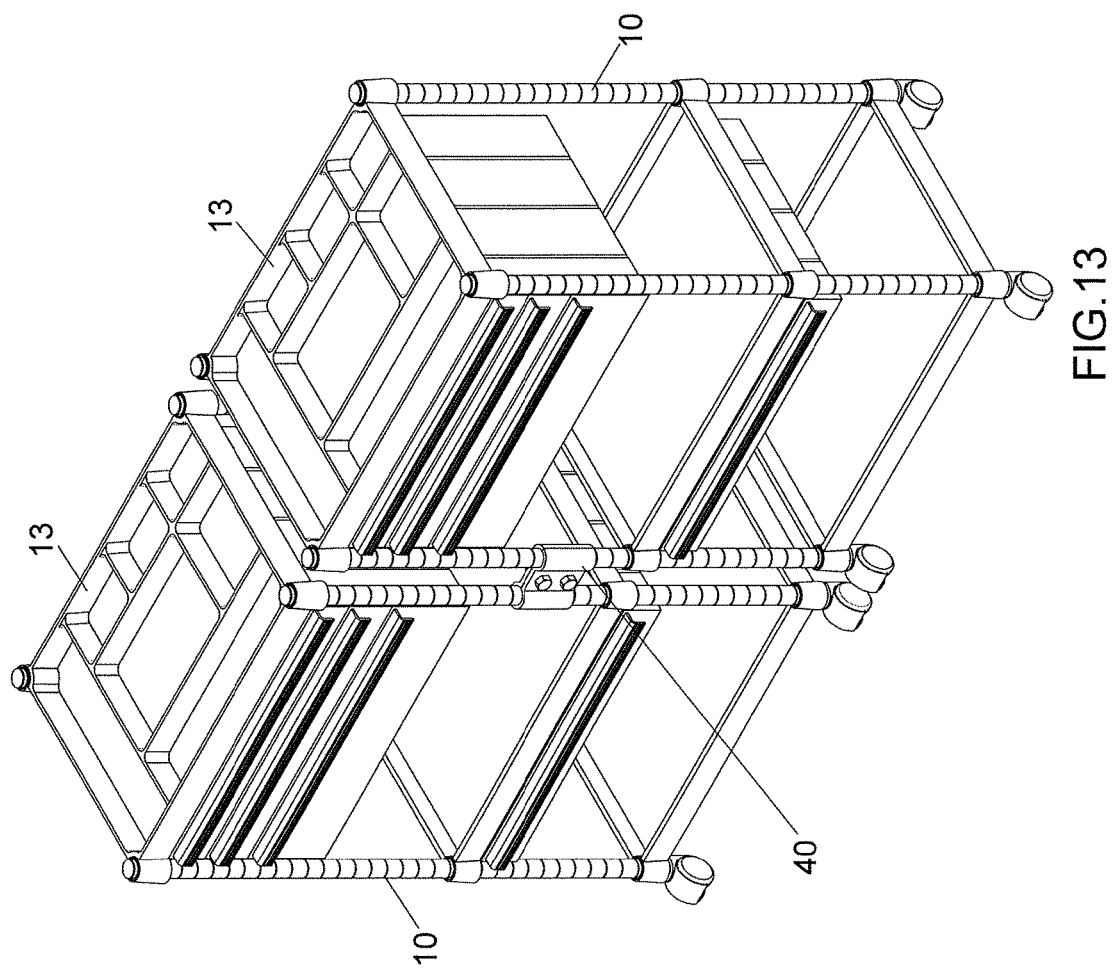
FIG. 13 is a perspective view to show the third embodiment of the cart of the present invention.
Figure 12:
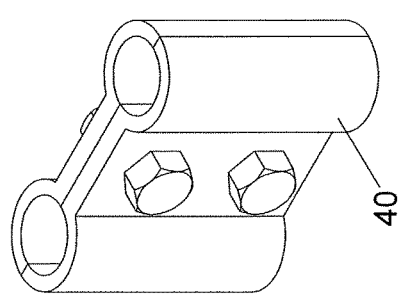
FIG. 12 shows the connector used in the third embodiment of the cart of the present invention.

As won in FIGS. 12 and 13, in this embodiment, at least two connectors 40 are used. Each connector 40 includes two curved plates on two ends thereof, and the two connectors 40 are connected to each other by two bolts. The two curved plates of each connector 40 are respectively mounted to the two first posts 11 of two adjacent frames 10 so as to connect the two frames 10 to each other.

Figure 14:
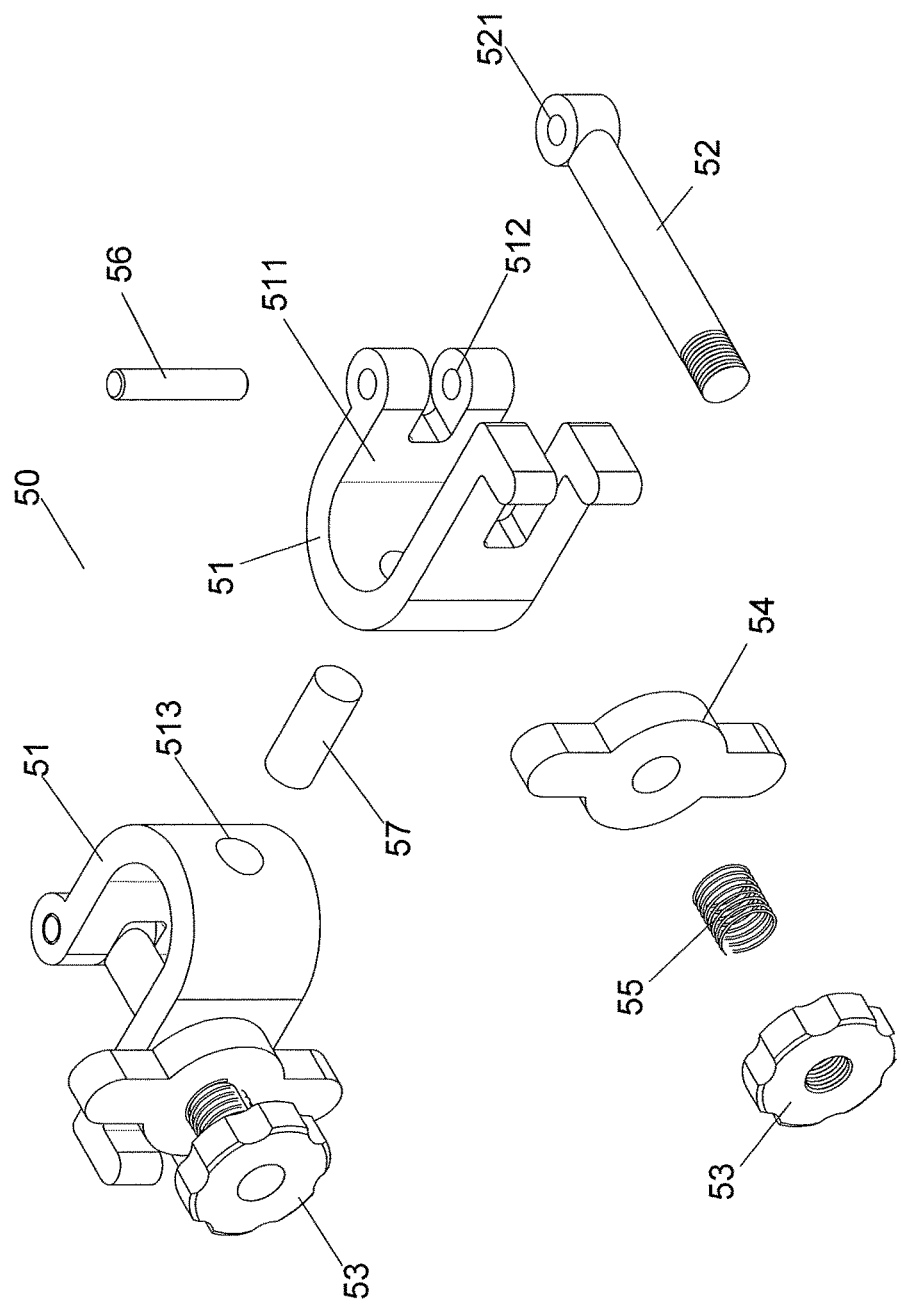
FIG. 14 is an exploded view of the connection unit used in the fourth embodiment of the present invention.
Figure 15:
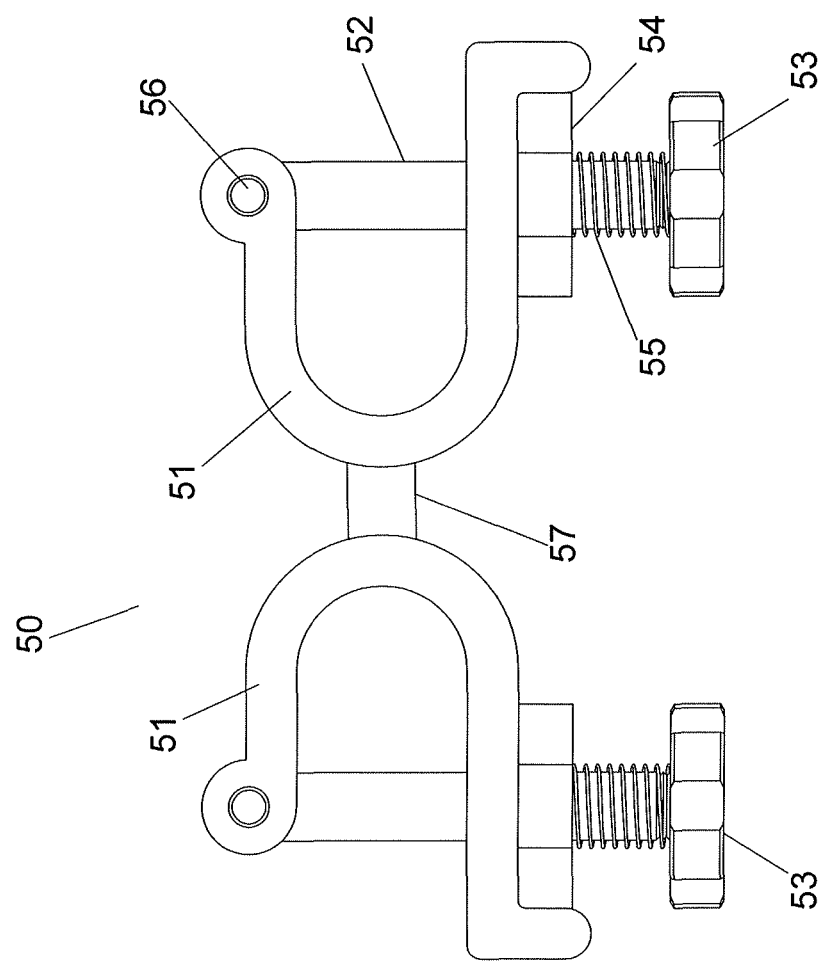
FIG. 15 is a side view to show the connection unit used in the fourth embodiment of the present invention.

FIGS. 14 and 15 show the use of a connection unit 50 to connect two carts, wherein the connection unit 50 includes two first connection members 51, two second connection members 52, two knobs 53, two restriction members 54, two resilient members 55, two pins 56 and a bridge member 57. The two first connection members 51 are arranged to be reversed to each other, and each first connection member 51 is a U-shaped member and has a space 511 through which the first post 11 extends. Each first connection member 51 has a first pivotal portion 512 on the first end thereof, and a connection hole 513 defined through the second end thereof. The two respective connection holes 513 of the two first connection members 51 face each other. Each second connection member 52 has a second pivotal portion 521 defined through the first end thereof and a threaded portion on the second end thereof. Each of the pins 56 extends through the first pivotal portion 512 and the second pivotal portion 521 so that the second connection member 52 is pivotable relative to the first connection member 51 corresponding thereto. Each knob 53 has a threaded passage which is threadedly connected to the threaded portion of the second connection member 52 corresponding thereto. Each restriction member 54 is movably mounted to the second connection member 52 corresponding thereto. When the restriction member 54 contacts the first connection member 51, the restriction member 54 restricts the second connection member 52 to be pivotable relative to the first pivotal portion 512. On the contrary, when the restriction member 54 does not contact the first connection member 51, the second connection member 52 is pivotable relative to the first pivotal portion 512 to open the first end of the first connection member 51. The resilient member 55 is mounted to the second connection member 52 corresponding thereto and biased between the knob 53 and the restriction member 54 which is pushed to contact the first connection member 51. The bridge member 57 is connected to the two respective connection holes 513 of the two first connection members 51. The two first connection members 51 are symmetrical to each other by the bridge member 57.

Figure 16:
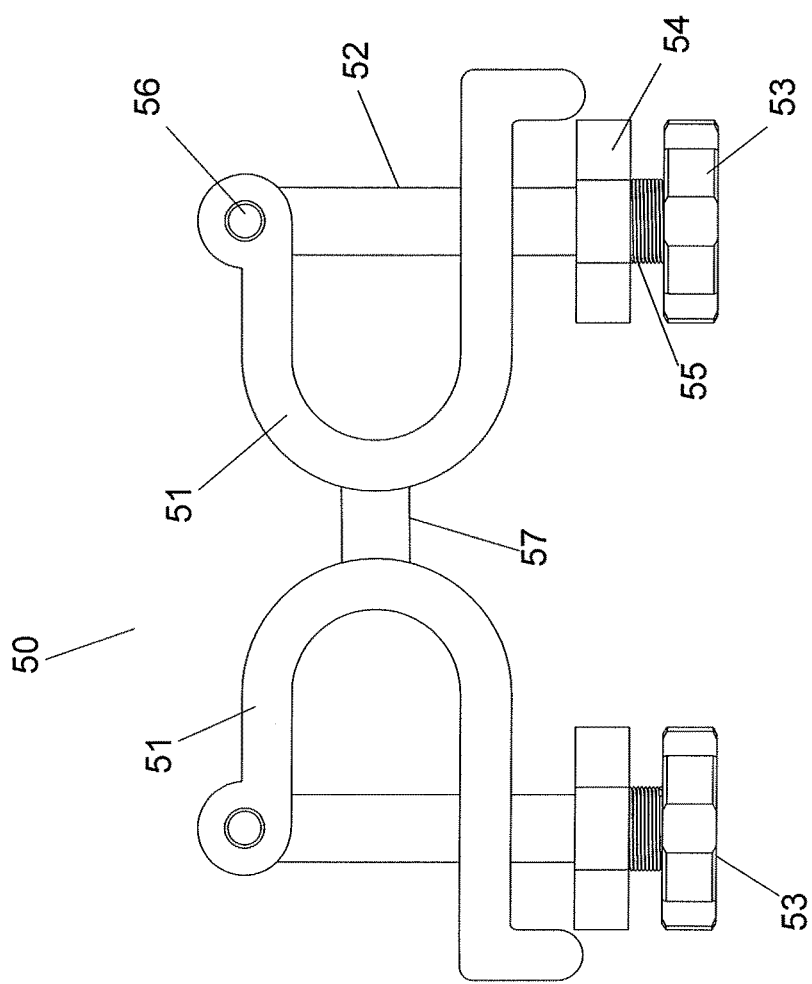
FIG. 16 shows the first operational status of the connection unit used in the fourth embodiment of the present invention.
Figure 17:
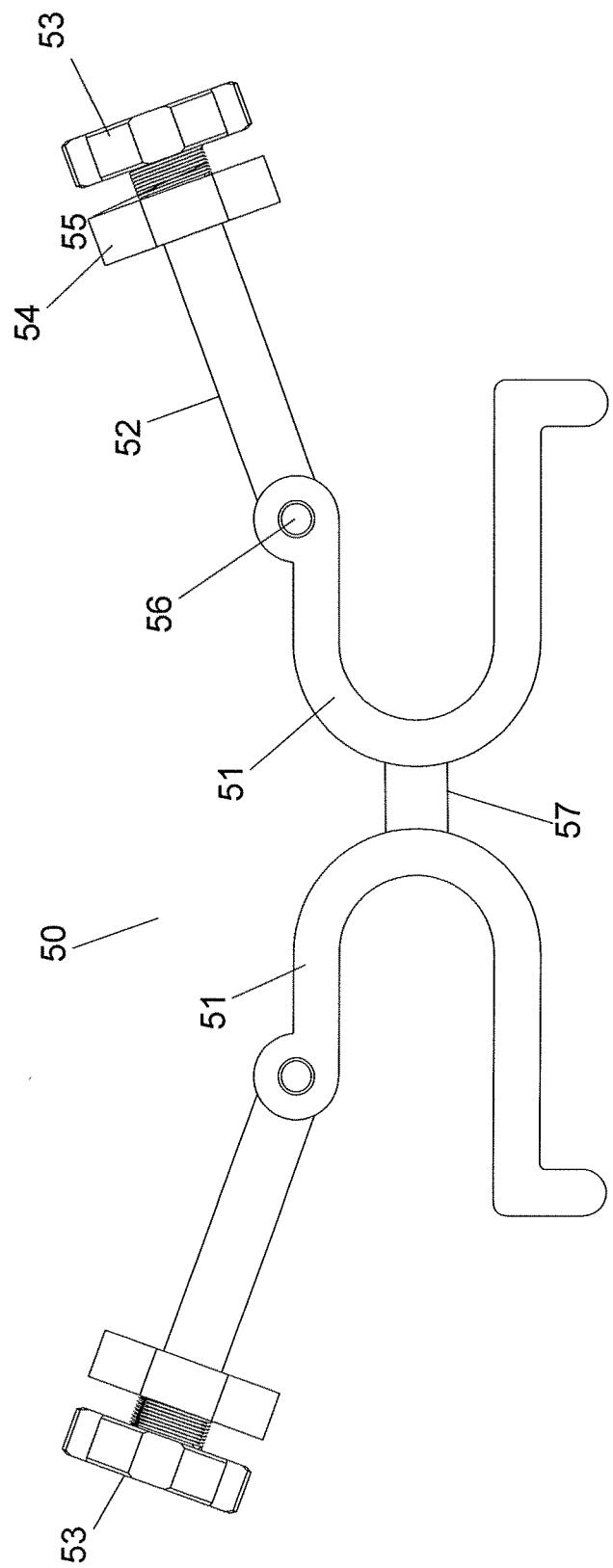
FIG. 17 shows the second operational status of the connection unit used in the fourth embodiment of the present invention.

FIGS. 16 and 17 show that when the restriction member 54 is pulled toward the knob 53, the resilient member 55 is compressed, and the second connection member 52 is not restricted by the restriction member 54, so that the second connection member 52 is able to be pivoted about the first pivotal portion 512 as shown in FIG. 17.

Figure 18:
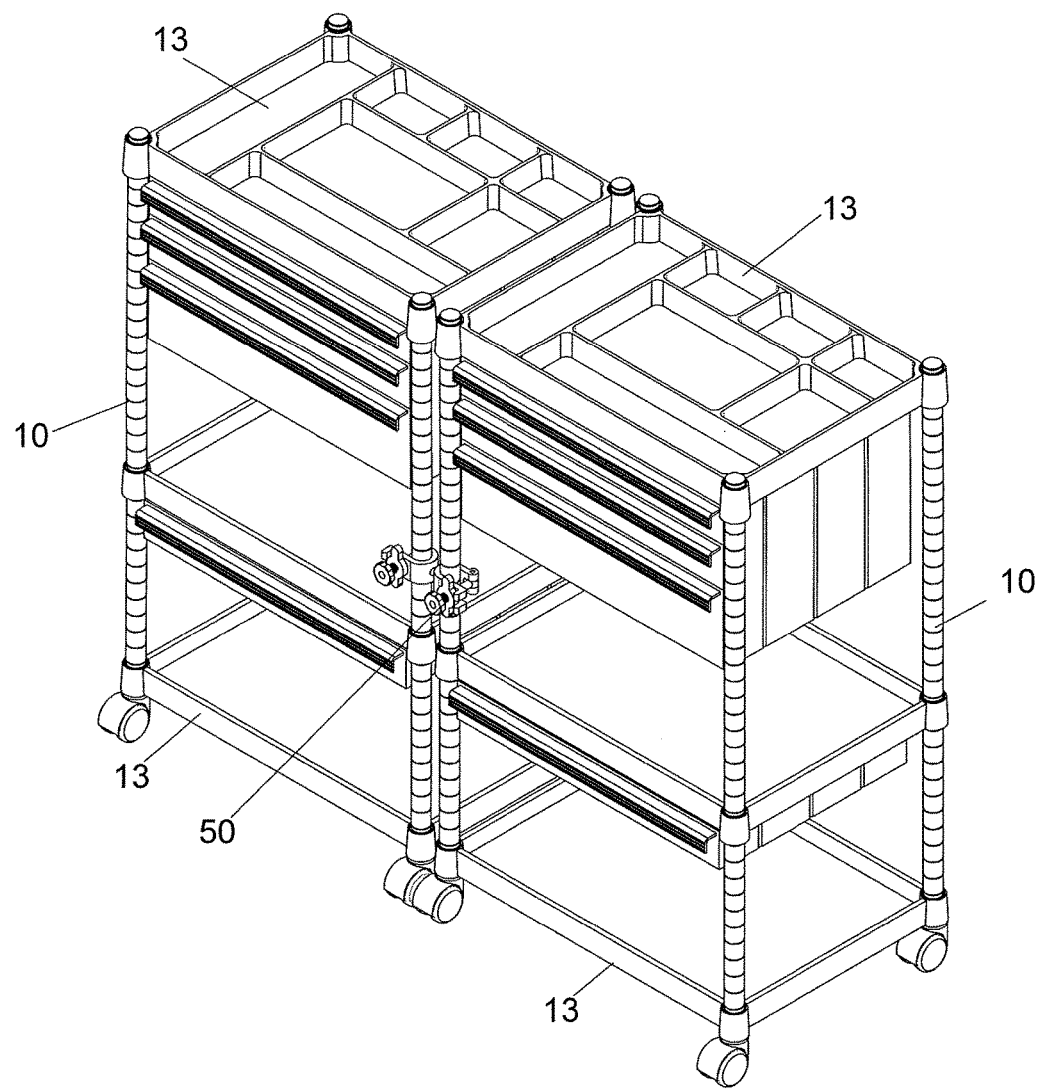
FIG. 18 is a perspective view to show the fourth embodiment of the cart of the present invention.

As shown in FIG. 18, the two first posts 11 of the two adjacent carts are respectively received in the spaces 511 of the two first connection members 51 of the connection unit 50, so that the two adjacent carts are connected to each other by the connection unit 50.

Figure 19:
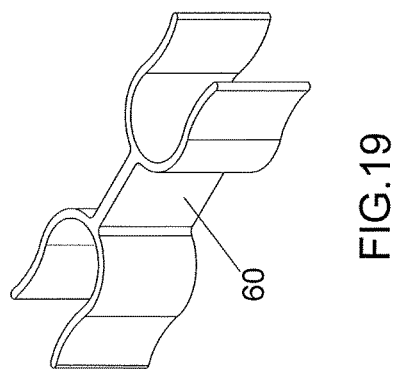
FIG. 19 shows the fifth embodiment of the cart of the present invention and the clip member used in the fifth embodiment of the cart of the present invention.
Figure 20:
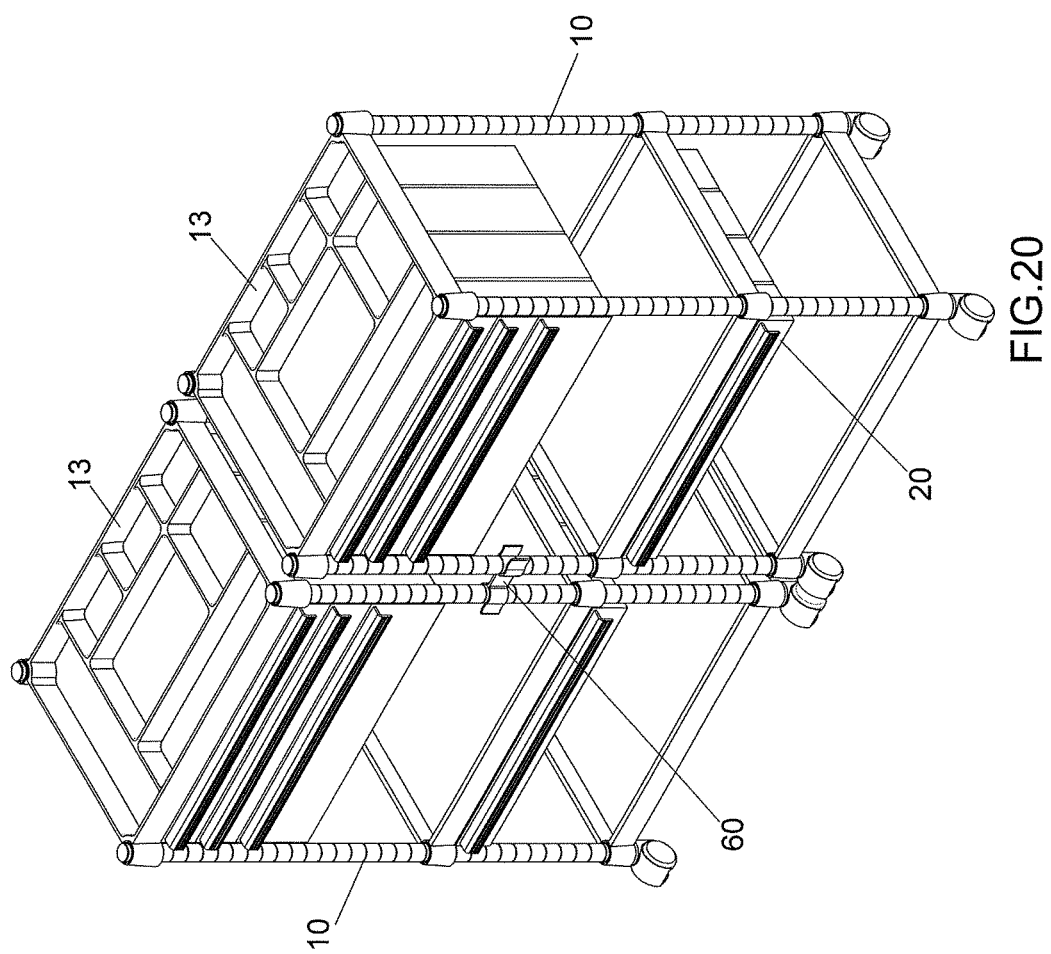
FIG. 20 shows the clip in FIG. 19.

FIGS. 19 and 20 show that the use of the clip member 60 which has two U-shaped clip portions which clamp the two first posts 11 of the two adjacent frames 10.

FIGS. 20 to 23 show multiple side panels 70, and each side panel 70 has two third fixing members 71 on two sides thereof. The two third fixing members 71 clamp two of the first posts 11 of the frame 10. Each side panel 70 has multiple second apertures 72 so as to be connected to hooks which can be used to hook tools. Each frame 10 may have three side panels 70 as disclosed.

Figure 24:
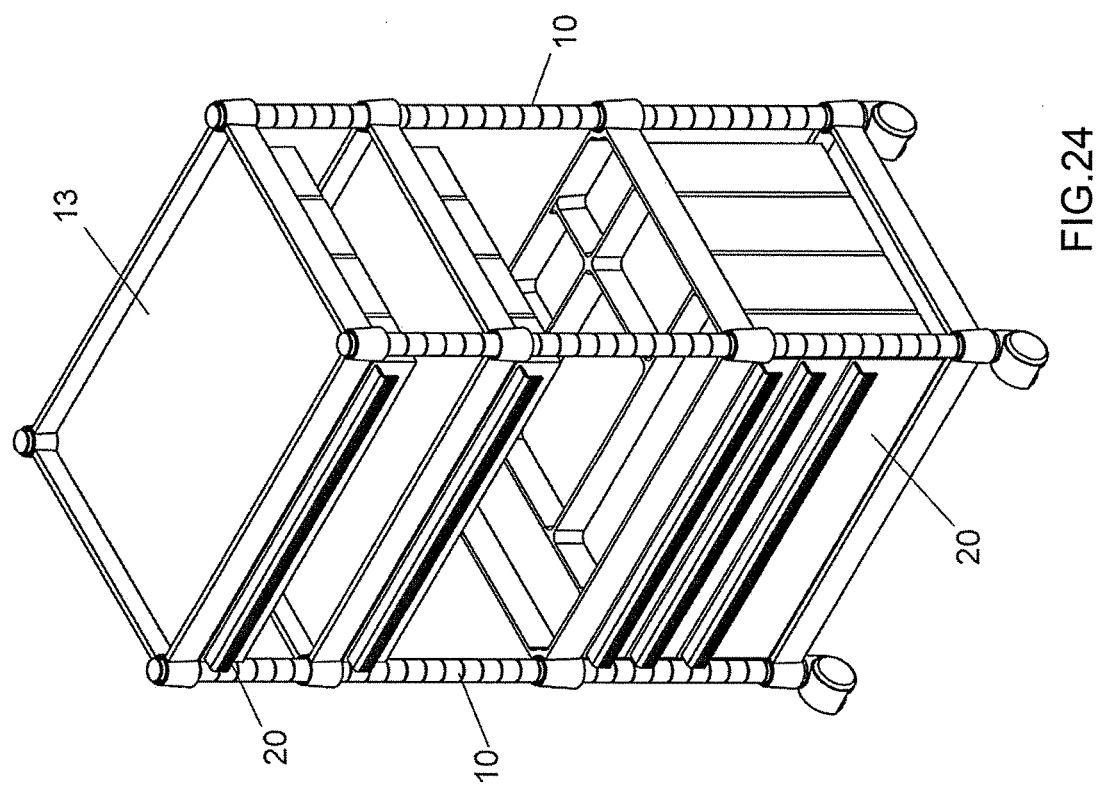
FIG. 24 is a perspective view to show the seventh embodiment of the cart of the present invention.

As shown in FIG. 24, the frame 10 has four trays 13. One box 20 having one inner body 22 is located between a first tray 13 and a second tray 13. The other one box 20 having three inner bodies 22 is located between the third tray 13 and the fourth tray 13.

Figure 25:
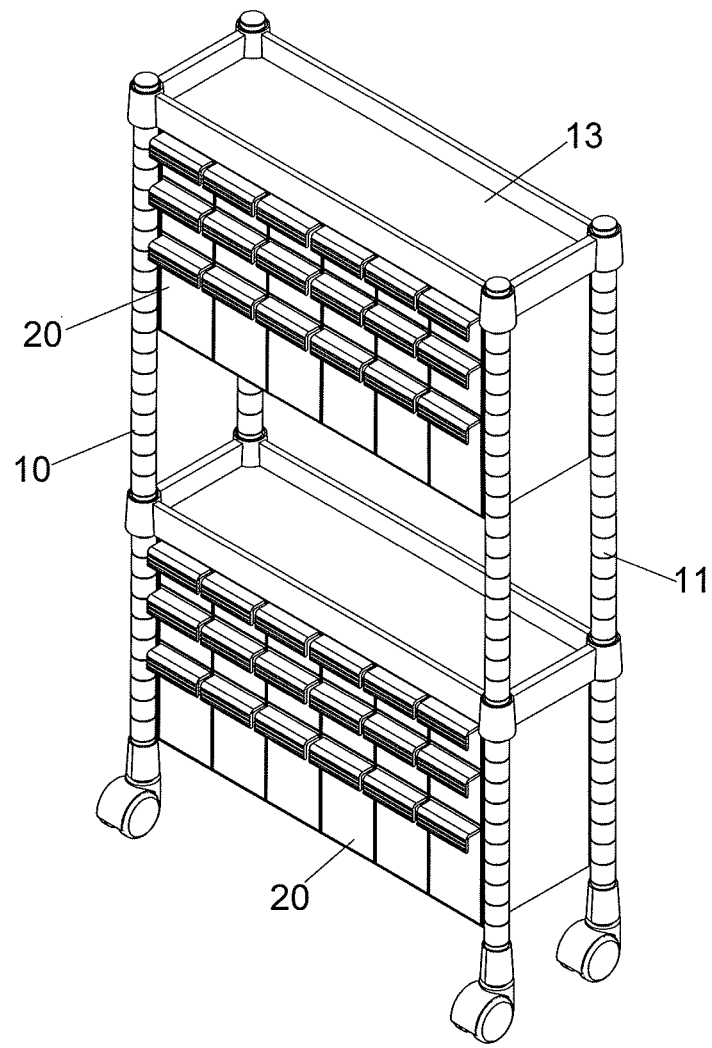
FIG. 25 is a perspective view to show the eighth embodiment of the cart of the present invention.

FIG. 25 shows that the frame 10 has two trays 13 and each tray 13 is a thin tray. One box 20 is located between the two trays 13 and is used as a parts box. The cart is a parts cart.

Figure 26:
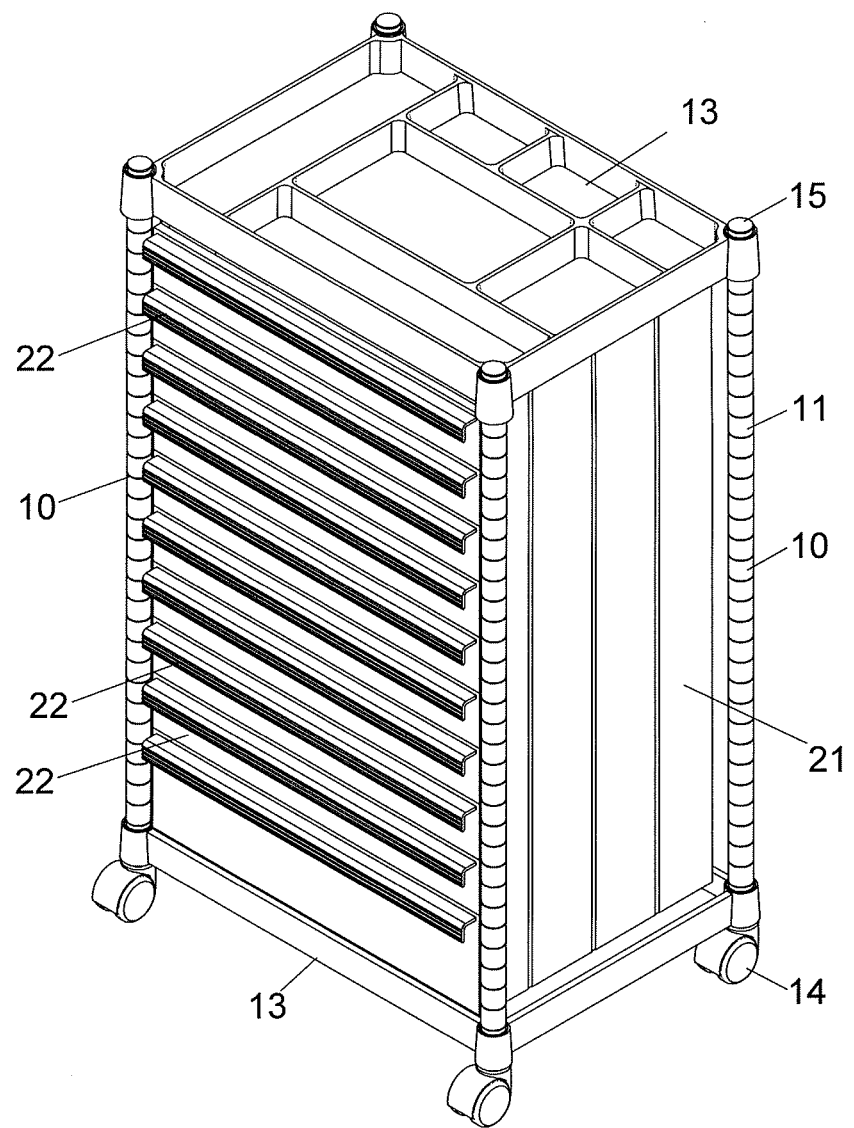
FIG. 26 is a perspective view to show the ninth embodiment of the cart of the present invention.

As shown in FIG. 26, the frame 10 includes a first tray 13 and a second tray 13, and one box 20 is located between the first and second trays 13. The box 20 includes one outer body 21 and three inner bodies 22 which are used as drawers and movably received in the outer body 21.

Figure 27:
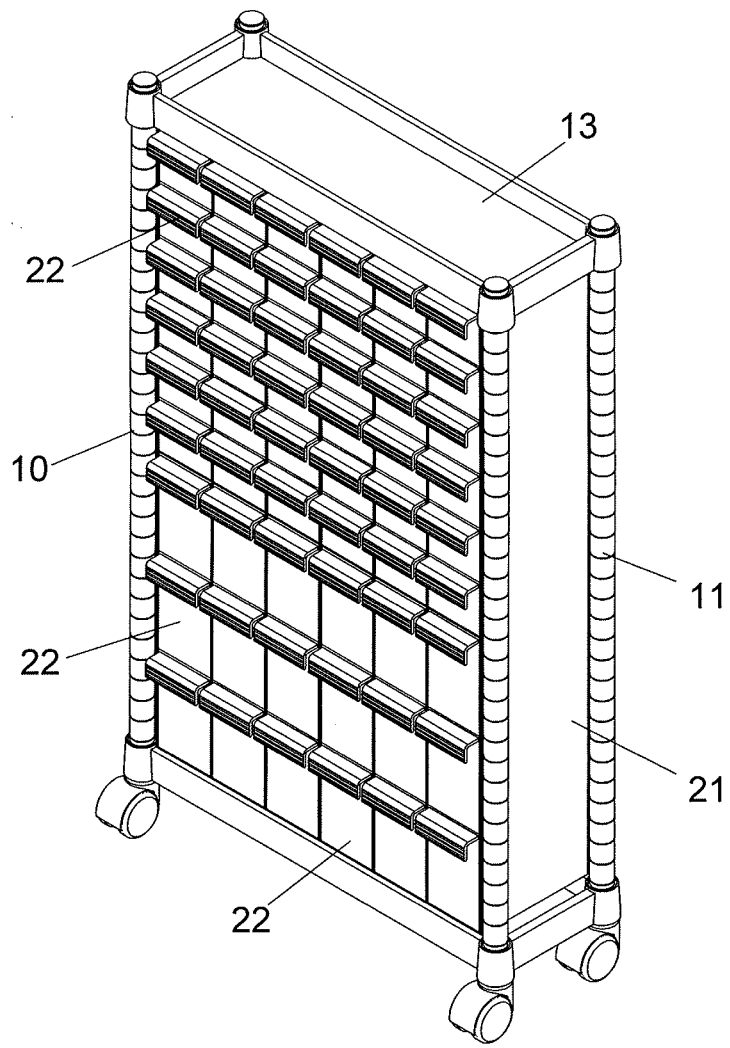
FIG. 27 is a perspective view to show the tenth embodiment of the cart of the present invention.

FIG. 27 shows that the frame 10 has two trays and a box 20 having a certain height is connected between the two trays 13. The box 20 receives parts therein.

Figure 28:
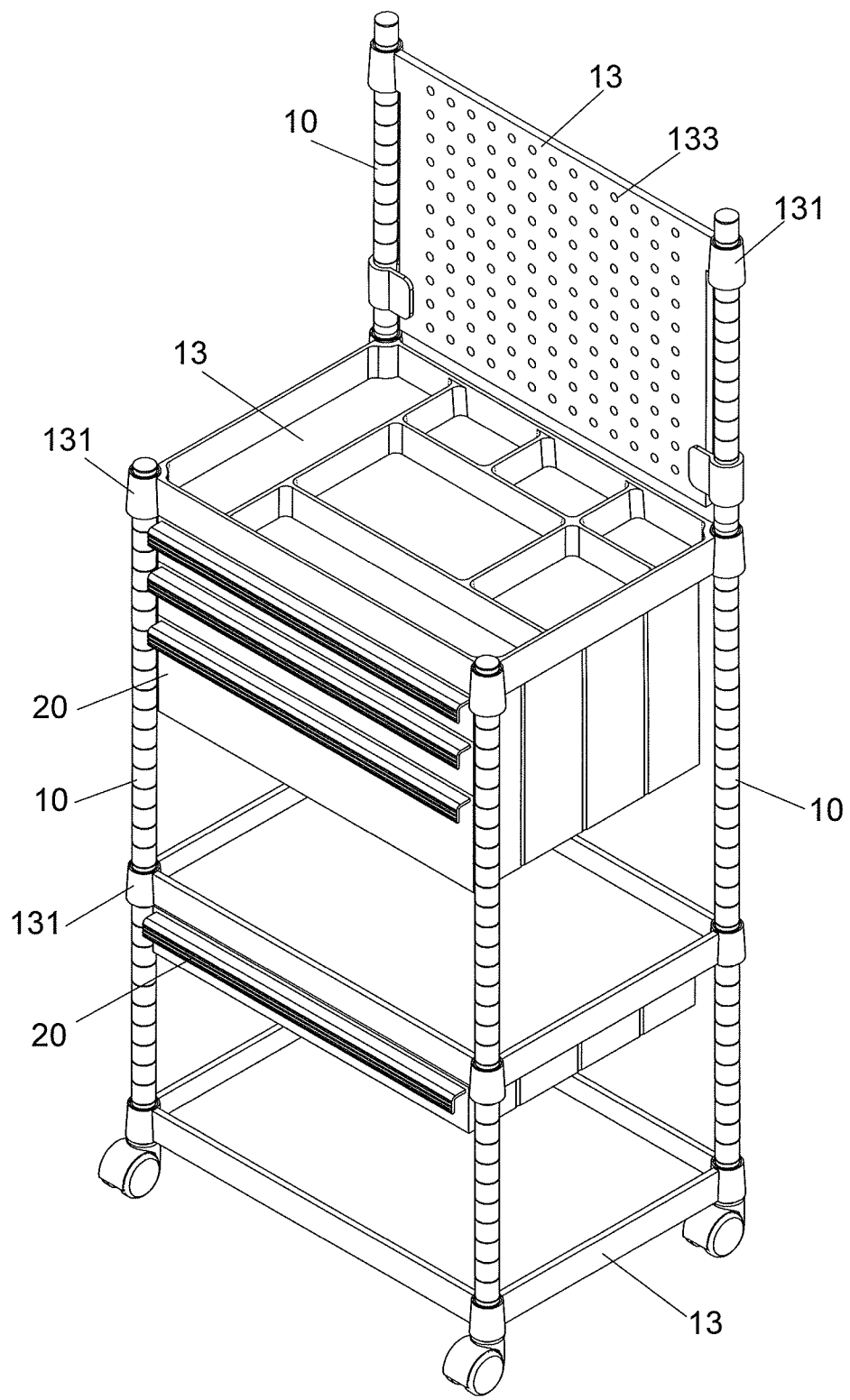
FIG. 28 is a perspective view to show the eleventh embodiment of the cart of the present invention.

FIG. 28 shows that the frame 10 has one tray 13 connected to the top thereof. The tray 13 has multiple first apertures 133 defined therethrough which are circular holes so as to be connected to multiple hooks.

Figure 29:
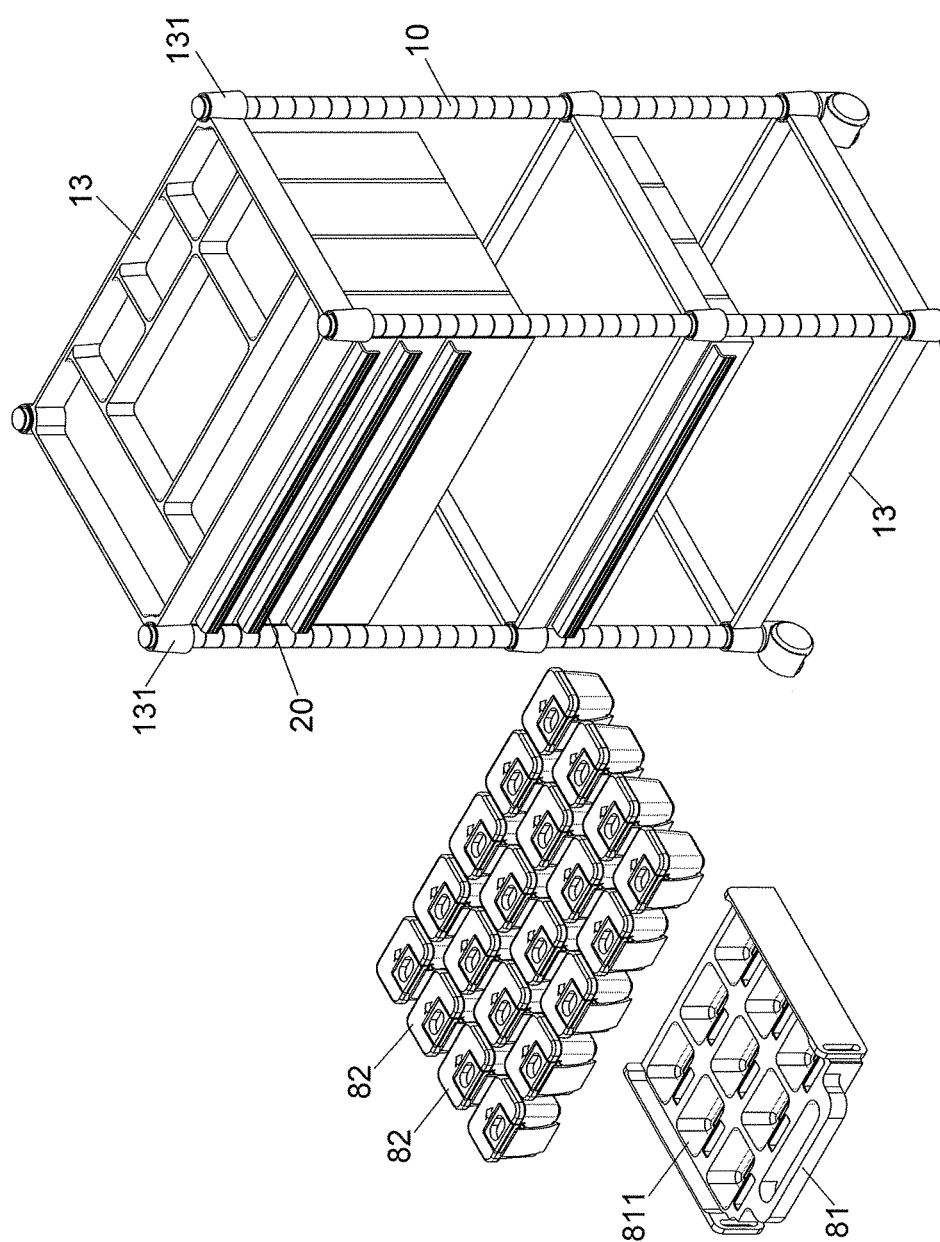
FIG. 29 is an exploded view to show the twelfth embodiment of the cart of the present invention.
Figure 30:
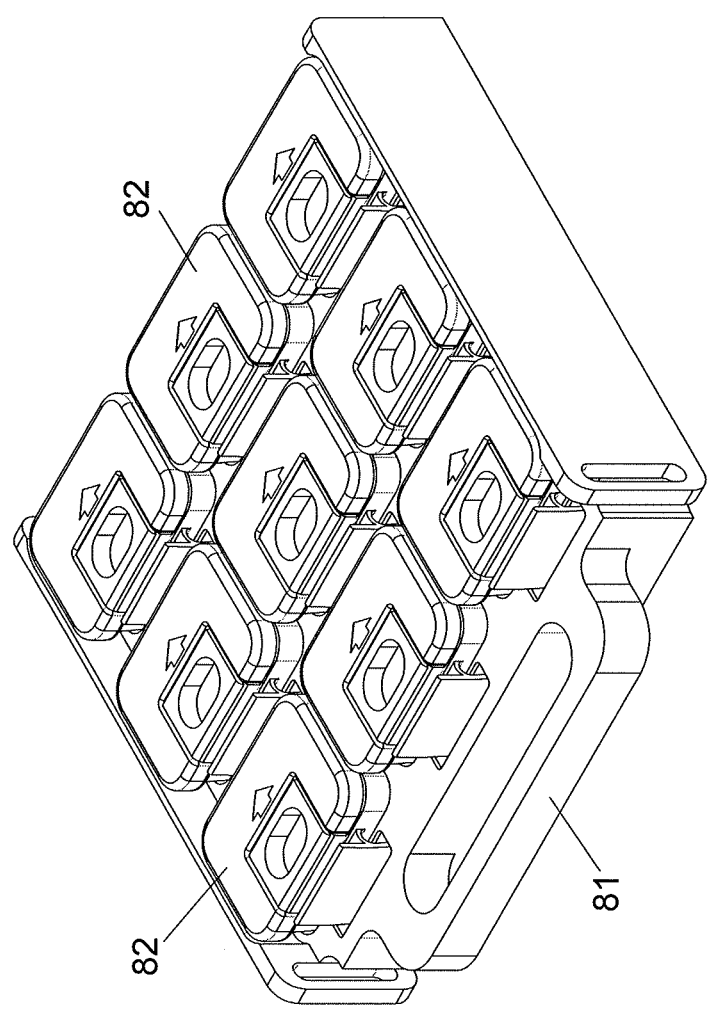
FIG. 30 shows the combination of the first box and the second boxes of the twelfth embodiment of the cart of the present invention.

FIGS. 29 and 30 show a first box 81 and multiple second boxes 82, wherein the first box 81 has multiple receiving portions 811 defined therein and each receiving portion 811 is a rectangular portion. Each receiving portion 811 receives one second box 82 which receives smaller parts and tools. The first box 81 is put in the tray 13. The second boxes 82 can be removed from the first box 81 and put in the inner bodies 22 of the box 20.

As shown in FIG. 10, the inner bodies 22 can be removed from the outer body 21, and then put into the receiving portions 811 of the first box 81. The inner bodies 22 are easily carried by using the first box 81.

The frames 10 may also be nailed on a wall by fixing the first posts 11 to the wall.

The frame 10 and the boxes 20 are easily assembled and separated from teach other to save storage space required.

The inner bodies 22 are received in the box 20, and parts or tools are received in the inner bodies 22 and easily organized.

The boxes 20 can be used individually as a tool box without moving the whole cart.

FIGS. 6, 11, 24 and 26 show that the cart can be composed of a frame 10 and multiple boxes 20, the users have multiple options of combinations.

FIG. 7 shows that the cart can be separated into compact portions to be easily transported and stored.

FIGS. 13, 18 and 19 shows that multiple frames 10 can be connected to each other by using the connectors 40, the connection units 50 or clip members 60.

Figure 21:
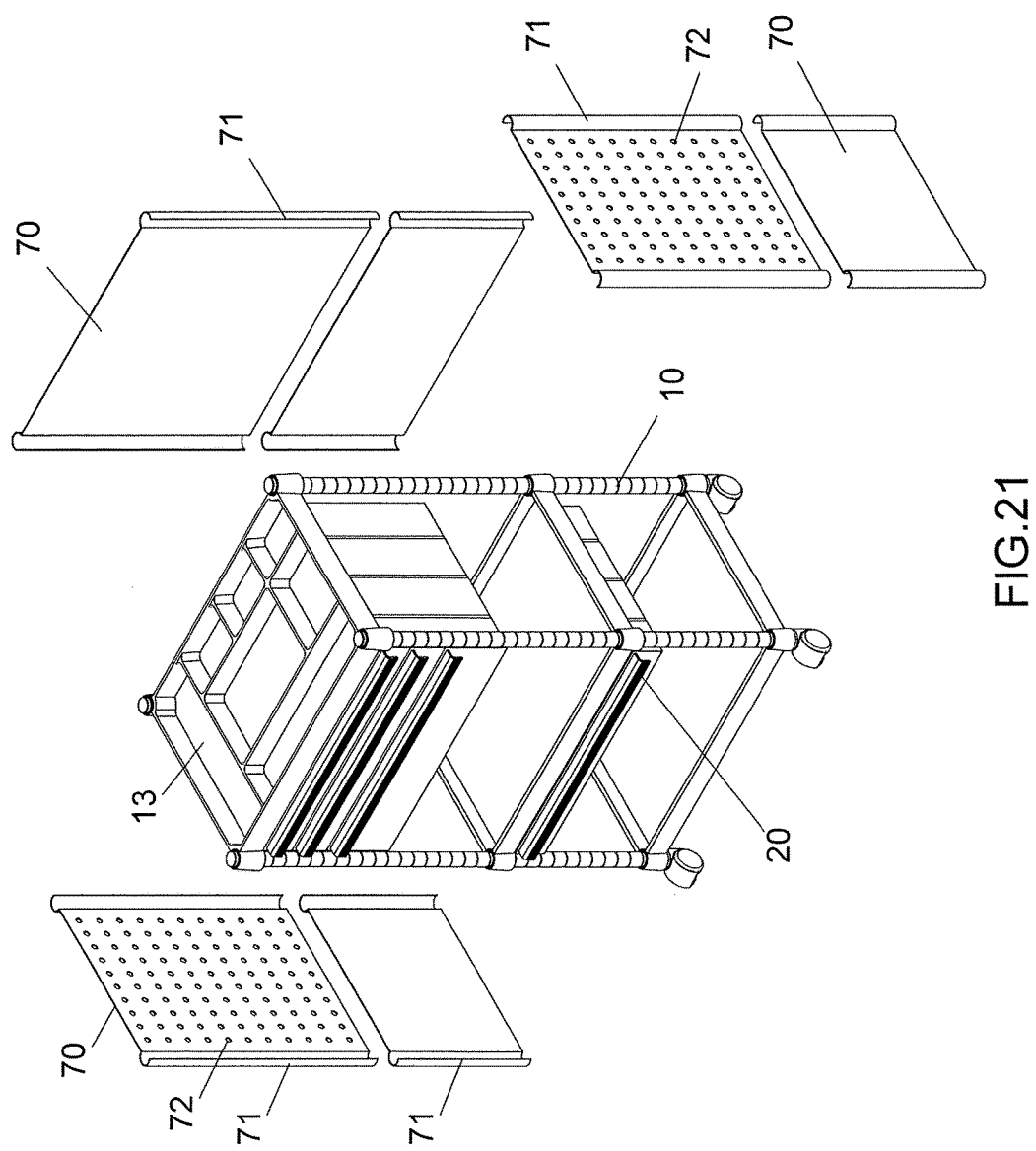
FIG. 21 is an exploded view to show the sixth embodiment of the cart of the present invention.
Figure 22:
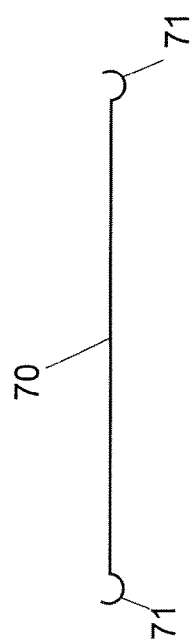
FIG. 22 shows the side panel and the third fixing members on two sides of the side panel used in the sixth embodiment of the cart of the present invention.
Figure 23:
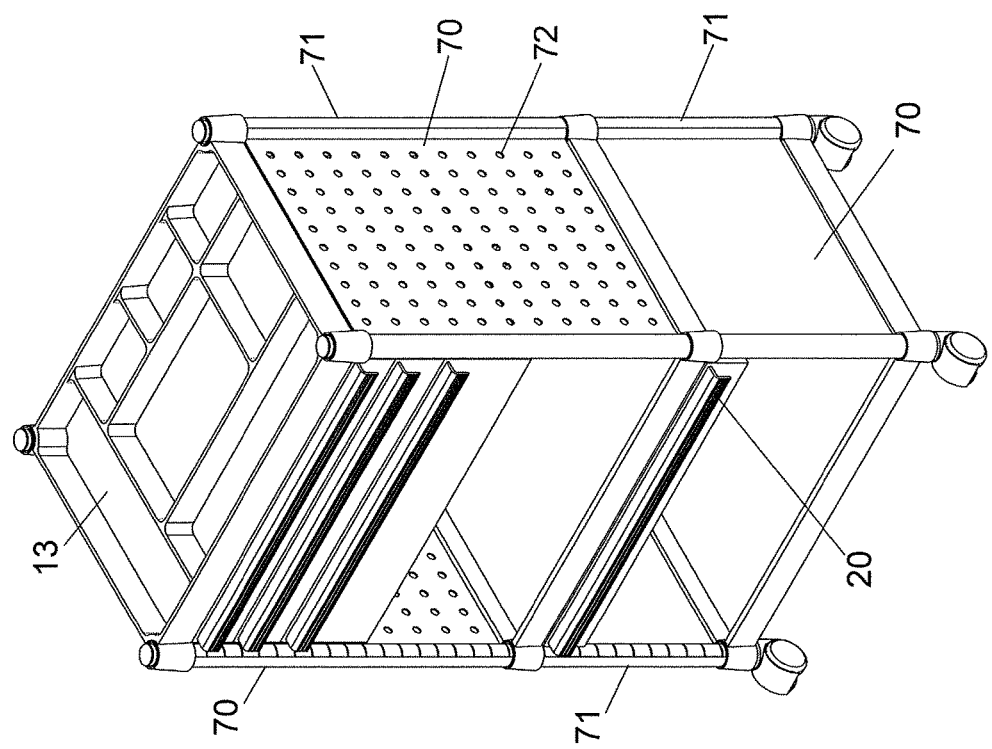
FIG. 23 is a perspective view to show the sixth embodiment of the cart of the present invention.

FIGS. 21 to 23 show the use of the side panels 70, and multiple hooks can be hooked to the second apertures 72 to expand the range of use of the cart.

FIGS. 29 and 30 show that the first box 81 has multiple second boxes 82 received therein so as to respectively receive parts therein. The combination of the first box 81 and the second boxes 82 can be put on the tray 13 of the frame 10, and used independently as a tool box.

While we have shown and described the embodiment in accordance with the present invention, it should be clear to those skilled in the art that further embodiments may be made without departing from the scope of the present invention.

What is claimed is:

1. A cart for storage of tools and parts, comprising:
a frame having four detachable first posts, twenty four fixing members, multiple trays, four wheels and four covers;
the first posts each having multiple grooves defined radially in an outer periphery thereof, a threaded hole defined in a top of each first post;
each fixing member being a plate having a semi-circular cross section, a protrusion extending from an inner periphery of each of the fixing members so as to be engaged with the groove, each fixing member having a tapered outer face, three pairs of the fixing members connected to each one of the first posts;
each tray having a cone-shaped first fixing member on each of four corners thereof, the four first fixing members respectively connected to the four first posts, each tray having at least one first room defined therein, the multiple trays connected to the four first posts and located between the four first posts;
each of the first posts has one wheel connected to a lower end thereof so that the frame is movable;
the four covers respectively connected to the threaded holes of the four first posts, and
two boxes connected between the trays and each box being a tool box, each box having an outer body and at least one inner body, the outer body having an open top and an open side, the outer body having a second room, two second fixing portions respectively extending from two sides of outer body, the second fixing portions respectively connected to two sides of an underside of the tray located above the box, the at least one inner body being movably inserted into the second room of the outer body and located between the tray and the outer body, the at least one inner body having an open top, one of the two boxes having one inner body received therein, the other one of the two boxes having three inner bodies receiving therein.

2. The cart as claimed in claim 1, wherein each of the two boxes has a first rail, a second rail and a third rail on each of two sides thereof, the second rail is movably connected an inside of the first rail corresponding thereto, the third rail is movably connected an inside of the second rail corresponding thereto, the first rails are fixed to the outer body, the third rail are fixed to the inner body, the first, second and third rails restrict a maximum distance that the inner body is moved relative to the outer rail.

3. The cart as claimed in claim 1, wherein two second posts are connected to the four first posts, each second post is shorter than that of the first post, each second post has a threaded section which are threadedly connected to the threaded hole of the first post corresponding thereto, another tray and another box are connected between the two second posts.

4. The cart as claimed in claim 1, wherein one of the outer bodies has multiple second rooms defined therein, each second room has one inner body movably received therein, each inner body is a rectangular box with an open top.

5. The cart as claimed in claim 1 further comprising at least two connectors, each connector including two curved plates on two ends thereof, the two connectors connected to each other by at least one bolt, the two curved plates of each connector respectively mounted to the two first posts of two frames so as to connect the two frames to each other.

6. The cart as claimed in claim 1 further comprising a connection unit which includes two first connection members, two second connection members, two knobs, two restriction members, two resilient members, two pins and a bridge member, the two first connection members being arranged to be reversed to each other, each first connection member being a U-shaped member and having a space through which the first post extends, each first connection member having a first pivotal portion on a first end thereof, and a connection hole defined through a second end thereof, the two respective connection holes of the two first connection members facing each other, each second connection member having a second pivotal portion defined through a first end thereof and a threaded portion on a second end thereof, each of the pins extending through the first pivotal portion and the second pivotal portion so that the second connection member is pivotable relative to the first connection member corresponding thereto, each knob having a threaded passage which is threadedly connected to the threaded portion of the second connection member corresponding thereto, each restriction member being movably mounted to the second connection member corresponding thereto, when the restriction member contacts the first connection member, the restriction member restricts the second connection member to be pivotable relative to the first pivotal portion, when the restriction member does not contact the first connection member, the second connection member is pivotable relative to the first pivotal portion to open the first end of the first connection member, the resilient member being mounted to the second connection member corresponding thereto and biased between the knob and the restriction member which is pushed to contact the first connection member, the bridge member connected to the two respective connection holes of the two first connection members.

7. The cart as claimed in claim 1 further comprising a clip member which has two U-shaped clip portions which clamp the two first posts of two frames.

8. The cart as claimed in claim 1 further comprising multiple side panels, each side panel having two third fixing members on two sides thereof, the two third fixing members clamping two of the first posts of the frame, each side panel having multiple second apertures so as to be connected to hooks.

9. The cart as claimed in claim 1, wherein the frame has four trays, one box having one inner body is located between a first tray and a second tray, one box having three inner bodies is located between the third tray and the fourth tray.

10. The cart as claimed in claim 1, wherein the frame has two trays, one box is located between a first tray and a second tray, the box has one outer body and three inner bodies which are movably received in the outer body.

11. The cart as claimed in claim 1, wherein the frame has one tray connected to a top thereof, the tray has multiple first apertures defined therethrough so as to be connected to multiple hooks.

* * * * *